Oct. 26, 1937.　　　　F. SANDERS　　　　2,097,105

AUTOMATIC CHAIN RELEASE

Filed Jan. 19, 1937

Inventor
Frank Sanders,

By Clarence A O'Brien
Hyman Berman
Attorneys

Patented Oct. 26, 1937

2,097,105

UNITED STATES PATENT OFFICE 2,097,105

AUTOMATIC CHAIN RELEASE

Frank Sanders, Sheridan, Ark.

Application January 19, 1937, Serial No. 121,379

2 Claims. (Cl. 24—69)

This invention relates to an improved automatic chain release which is expressly, but not necessarily, adapted for use in temporarily connecting together the ends of chains, such as for example, the circumferential side chains utilized in constructing automobile tire anti-skid chains, logging chains, drag line chains, and the like.

The purpose of the invention is, as is evident, to generally improve upon chain-end fasteners and connecting devices of this type by providing a simple, reliable, and economical arrangement especially desirable because of the expediency with which it may be satisfactorily handled.

All persons familiar with tire chains and present day types of fastening and retaining devices are also familiar with the difficulties and disadvantages attending that phase of the operation having to do with the attaching and releasing of the fastener means. It follows, therefore, that I have, after due deliberation and consideration, perfected what I believe to be an ingenious chain-end fastener which will facilitate use thereof under any and all trying conditions.

In reducing to practice the principles of the present inventive improvement, I have evolved and produced a triple-part arrangement characterized by a yoke-like adapter member permanently carried on one end of the chain, this having pivotally mounted thereon a notched connector and retention disk, and a hand-operated retaining latch or detent therefor.

Other features and advantages may become apparent from the following description and accompanying drawing.

In the drawing, wherein like numerals are employed to designate like parts throughout the same:

Figure 1:
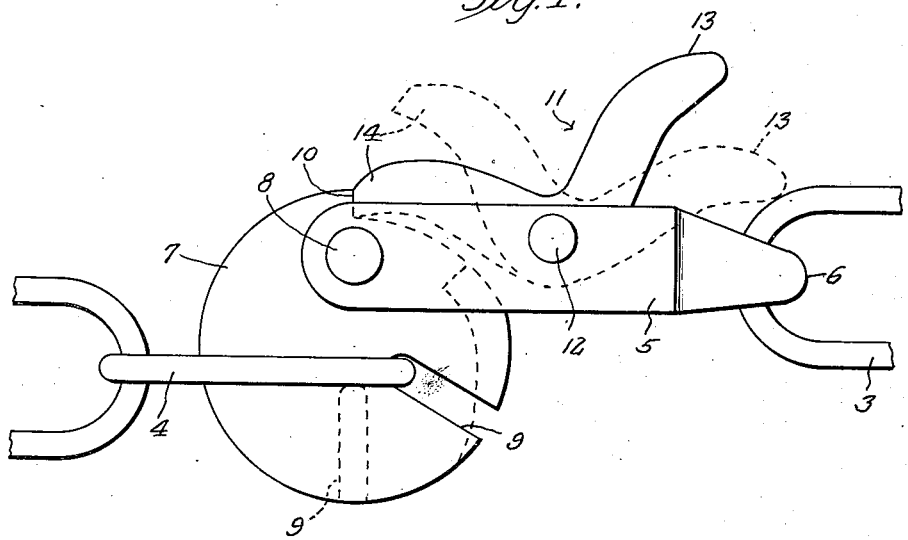
Figure 1 is an elevational view showing the chain ends and illustrating the improved fastener means associated therewith.
Figure 2:
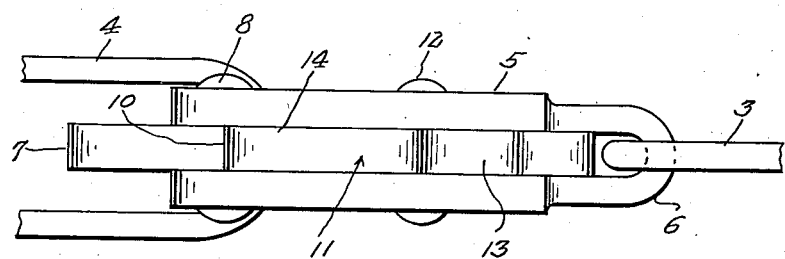
Figure 2 is a top plan view of the arrangement depicted in Figure 1.

As seen in the drawing, one end link of the chain is denoted by the numeral 3, and the complemental link at the other end of the chain is indicated at 4. The three-part fastener means is carried entirely by the link 3. As before indicated, it comprises a substantially U-shaped member which may be described as the adapter yoke 5. The tapered bight portion 6 thereof is connected with the link 3. The coupling or connector disk is denoted by the numeral 7, and this is eccentrically pivoted as at 8 between the free ends of the spaced parallel arms of said adapter yoke 5. This turnable eccentric disk 7 is formed at a predetermined point with a keeper notch 9 and at a circumferentially spaced point with a stop shoulder 10. The hand-operated latch is denoted by the numeral 11 and this is substantially V-shaped in form. It is pivoted intermediate its ends as at 12 at a point centrally of the longitudinal dimensions of the arms in the part 5. One end 13 forms what may be designated as a finger-piece and the opposite end 14 designates the detent which is engageable with the stop shoulder 10.

In practice the disk 7 is turned so that the keeper notch 9 is at substantial right angles to the approximately horizontal adapter yoke 5. Then the notch is slipped down over the adjacent end of the link 4 in an obvious manner. Now it is turned by the hand in an anti-clockwise direction until the latch 11 automatically swings its detent 14 behind the shoulder 10. The tension or pull of the chain-ends in attempting to separate maintains the detent 14 firmly engaged with the shoulder 10 and this in turn locks the disk 7 in place, as indicated in full lines in Figure 1.

This invention may obviously be referred to satisfactorily as a chain fastener in so far as it may be used in connection with automobile tire side chains. It was, however, adopted with the thought in mind of providing what may be conveniently referred to as an automatic release for logging chains.

For example, in the logging industry—our log trucks carrying some eighteen or twenty logs are boomed with chain and boomer; when this boomer is released in most cases the logs spread and become tighter, thereby forcing the chains to be cut to release the logs; if automatic release is attached, it only requires the light tap on the trigger, thereby releasing the chain in its entirety. Further, this automatic chain release will work on drag lines, tug boats, or any other anchor where chains are used.

As implied by the preceding paragraph, this unique device is not to be confused with the ordinary type of side chain connector and fastener employed in the automotive industry. That is to say, while the device can be used for that purpose, it is not nearly as satisfactory as when employed for example as a so-called logging chain. Obviously, in order to maintain the parts in the full line positions shown in Figure 1 of the drawing, it is essential that the tendency of the ends of the chain 3 and 4 to separate must be such as to exert a constant stress or pull tending to swing the notched disk 7 in a direction from right to left. In the logging industry where the ends of the chains are tight and the logs are swelled when wet, with the regular types of connectors or releases, as they are sometimes called, it is practically impossible to separate the ends of the chains. With this device, however, and as above pointed out, no matter how tight the latch 14 is jammed against the shoulder 10, a blow on the upstanding end portion 13 with a hammer will serve to bring about the so-called "automatic release" action.

It is thought that the description taken in connection with the drawing will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. A chain end connecting and release device comprising a clevis swingably and slidably connected with an end link at one end of the chain, a disk eccentrically and pivotally mounted between the free end portions of the arms of said clevis, said disk being provided with a marginal keeper notch for reception of the complemental end of the chain, and being further provided with a detent accommodation shoulder, the shoulder being positioned adjacent the eccentric pivot when the disk is in detaining position, and a pivoted detent carried by said clevis, said detent being substantially and wholly exposed to permit ready access to be had thereto, and one end being positioned for releasable engagement with said shoulder.

2. As a new article of manufacture, a chain end fastener for logging chains comprising a U-shaped clevis, the bight portion thereof being fashioned to engage an adjacent chain link, the arms being disposed in parallelism with the outer free ends rounded, a substantially V-shaped latch, the crotch portion thereof being pivotally fastened between the intermediate portions of the clevis arms, the diverging portions of said latch projecting beyond the adjacent edge portions of the clevis, one end serving as a trip, the opposite end having its terminal shaped to provide a detent, and a disk eccentrically and pivotally mounted between the free end portions of the arms of said clevis, said disk being revolvable between said arms and being provided with a radial keeper notch opening through its outer peripheral edge, and further provided at a circumferentially spaced point, within the vicinity of said pivot, with a marginal detent abutment shoulder.

FRANK SANDERS.